US012595681B2

(12) United States Patent
Prior et al.

(10) Patent No.: US 12,595,681 B2
(45) Date of Patent: Apr. 7, 2026

(54) TAILGATE SUBASSEMBLY ALIGNMENT SYSTEM AND ALIGNMENT METHOD

(71) Applicant: Ford Global Technologies, LLC, Dearborn, MI (US)

(72) Inventors: Joseph Prior, Detroit, MI (US); Joshua Robert Hemphill, White Lake, MI (US); Raul Ezequiel Alvarez Ruiz, Estado de Mexico (MX); Michael Shawn Watterworth, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 448 days.

(21) Appl. No.: 18/323,451

(22) Filed: May 25, 2023

(65) Prior Publication Data

US 2024/0392604 A1 Nov. 28, 2024

(51) Int. Cl.
E05B 15/00 (2006.01)
B62D 33/037 (2006.01)
E05B 83/02 (2014.01)

(52) U.S. Cl.
CPC ........ E05B 15/0006 (2013.01); B62D 33/037 (2013.01); E05B 83/02 (2013.01)

(58) Field of Classification Search
None
See application file for complete search history.

(56) References Cited

U.S. PATENT DOCUMENTS 2,936,195 A 5/1960 Schutte
3,387,406 A 6/1968 Coker et al.
(Continued)

FOREIGN PATENT DOCUMENTS

| DE | 3811729 | * | 11/1988 | |
| EP | 3272579 A1 | | 1/2018 | |
| FR | 2861417 A1 | * | 4/2005 | .............. E05F 7/005 |

OTHER PUBLICATIONS

Degraff, Robby, Gallery: The Ram 1500's new multi-function tailgate—Hooniverse, Feb. 11, 2019, accessed from https://hooniverse.com/gallery-the-ram-1500s-new-multi-function-tailgate/ on Mar. 21, 2023.

*Primary Examiner* — Joseph D. Pape

(74) *Attorney, Agent, or Firm* — Vichit Chea; Carlson, Gaskey & Olds, P.C.

(57) ABSTRACT

A tailgate assembly, includes a frame subassembly having a cargo bed access opening between a driver side section and a passenger side section, and a door subassembly that is pivotably coupled to the frame subassembly. The door subassembly is pivotable relative to the frame subassembly back-and-forth between a door open position and a door closed position. The door subassembly closes the cargo bed access opening when the door subassembly is in the door closed position. A latching system has a latch that engages a striker to hold the door subassembly in the door closed position. The tailgate assembly further includes an alignment system separate from the latching system. The alignment system includes an alignment post that is received within an alignment slot as the door subassembly is pivoted to the door closed position. The alignment post is configured to be received within the alignment slot to align the door subassembly relative to the frame subassembly prior to the latch contacting the striker.

20 Claims, 6 Drawing Sheets

(56)                    References Cited

U.S. PATENT DOCUMENTS

| | | | |
|---|---|---|---|
| 3,454,299 A | | 7/1969 | Hewitt et al. |
| 3,552,791 A | * | 1/1971 | Watermann ........... E05B 83/367 |
| | | | 292/304 |
| 4,861,099 A | * | 8/1989 | Sasamura ............... E05F 7/005 |
| | | | 29/434 |
| 6,247,744 B1 | * | 6/2001 | Townsend ............... E05F 7/005 |
| | | | 16/388 |
| 7,029,043 B2 | * | 4/2006 | Fisher ................. E05B 15/0006 |
| | | | 292/DIG. 40 |
| 10,358,172 B2 | | 7/2019 | Morley et al. |
| 11,118,381 B2 | | 9/2021 | Nelsen et al. |
| 2006/0001288 A1 | | 1/2006 | Thiele et al. |
| 2007/0296226 A1 | | 12/2007 | Gruber et al. |
| 2009/0183433 A1 | | 7/2009 | Cheung et al. |
| 2009/0250960 A1 | | 10/2009 | Townson et al. |
| 2014/0136021 A1 | | 5/2014 | Bambenek et al. |
| 2019/0185074 A1 | | 6/2019 | Morley et al. |

* cited by examiner

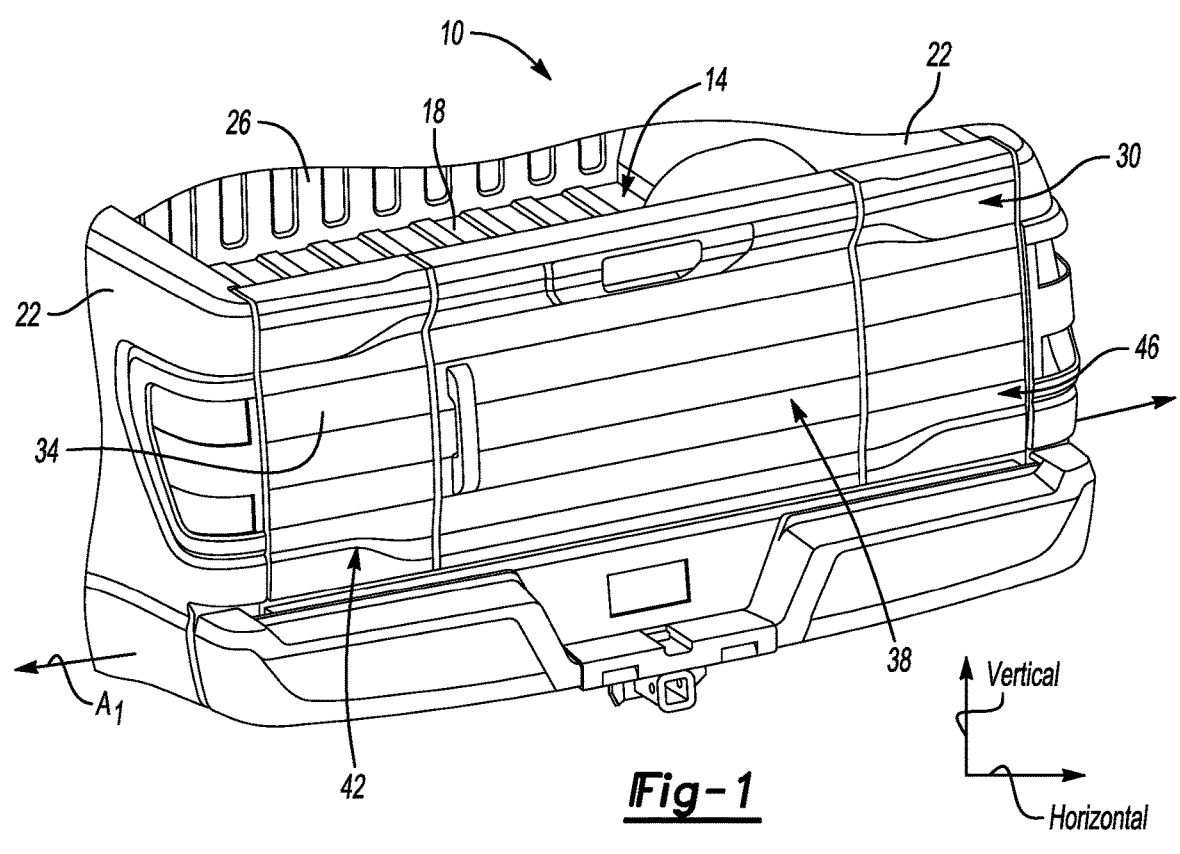
_Fig-1_
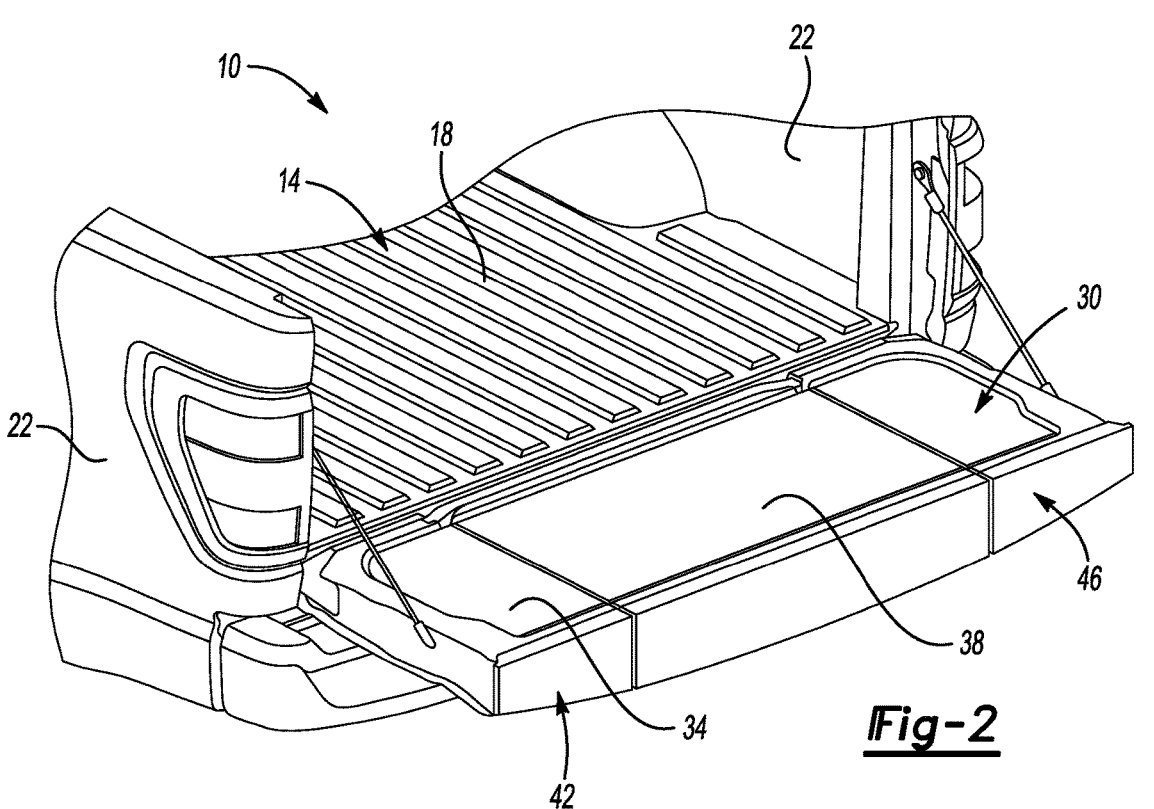
_Fig-2_

TAILGATE SUBASSEMBLY ALIGNMENT SYSTEM AND ALIGNMENT METHOD

TECHNICAL FIELD

This disclosure relates generally to a tailgate assembly and, more particularly, to aligning a door subassembly of the tailgate assembly.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions.

SUMMARY

In some aspects, the techniques described herein relate to a tailgate assembly, including: a frame subassembly having a cargo bed access opening between a driver side section and a passenger side section; a door subassembly that is pivotably coupled to the frame subassembly, the door subassembly pivotable relative to the frame subassembly back-and-forth between a door open position and a door closed position, the door subassembly closing the cargo bed access opening when the door subassembly is in the door closed position; a latching system having a latch that engages a striker to hold the door subassembly in the door closed position; and an alignment system separate from the latching system, the alignment system including an alignment post that is received within an alignment slot as the door subassembly is pivoted to the door closed position, the alignment post configured to be received within the alignment slot to align the door subassembly relative to the frame subassembly prior to the latch contacting the striker.

In some aspects, the techniques described herein relate to a tailgate assembly, wherein the frame subassembly and the door subassembly pivot together about a horizontally extending axis, wherein the door subassembly pivots relative to the frame subassembly about a vertically extending axis.

In some aspects, the techniques described herein relate to a tailgate assembly, wherein the driver side section is on a driver side of the cargo bed access opening in the tailgate assembly, and the passenger side section is on a passenger side of the cargo bed access opening.

In some aspects, the techniques described herein relate to a tailgate assembly, wherein the alignment slot includes a flared inlet section that tapers down to a primary section.

In some aspects, the techniques described herein relate to a tailgate assembly, wherein the primary section is at least partially provided by an upper edge configured to contact the alignment post to block vertically upward movement of the alignment post, and a lower edge configured to contact the alignment post to block vertically downward movement of the alignment post, the upper edge parallel to the lower edge.

In some aspects, the techniques described herein relate to a tailgate assembly, wherein the alignment post is configured to be received within the primary section to align the door subassembly relative to the frame subassembly prior to the latch contacting the striker.

In some aspects, the techniques described herein relate to a tailgate assembly, wherein the alignment post is configured to be received within the alignment slot to align the door subassembly vertically relative to the frame subassembly.

In some aspects, the techniques described herein relate to a tailgate assembly, wherein the latch and the alignment slot are on the door subassembly.

In some aspects, the techniques described herein relate to a tailgate assembly, wherein the latch is on the door subassembly and the striker is on the frame subassembly.

In some aspects, the techniques described herein relate to a tailgate assembly, wherein the alignment post is on the frame subassembly and the striker is on the frame subassembly.

In some aspects, the techniques described herein relate to a tailgate assembly, wherein the alignment post is aft of the striker when the door subassembly and the frame subassembly are in a tailgate closed position.

In some aspects, the techniques described herein relate to a tailgate assembly, wherein the latch and striker constrain forward and aft movement of the door subassembly relative to the frame subassembly when the door subassembly is in the door closed position.

In some aspects, the techniques described herein relate to a tailgate subassembly alignment method, including: pivoting a door subassembly of a tailgate assembly relative to a frame subassembly of the tailgate assembly from a door open position to a door closed position, the door subassembly closing a cargo bed access opening of the frame subassembly when the door subassembly is in the door closed position; during the pivoting, positioning an alignment post within an alignment slot to align the door subassembly relative to the door subassembly; and engaging a striker of a latching system with a latch of the latching system to hold the door subassembly in the door closed position.

In some aspects, the techniques described herein relate to a tailgate subassembly alignment method, wherein the alignment post is within the alignment slot prior to the latch engaging the striker.

In some aspects, the techniques described herein relate to a tailgate subassembly alignment method, wherein the alignment slot includes a flared inlet section that tapers down to a primary section, wherein the alignment post is within the primary section of the alignment slot prior to the latch engaging the striker.

In some aspects, the techniques described herein relate to a tailgate subassembly alignment method, wherein the alignment post within the alignment slot aligns the door subassembly vertically relative to the frame subassembly.

In some aspects, the techniques described herein relate to a tailgate subassembly alignment method, wherein the cargo bed access opening of the frame subassembly is between a driver side section and a passenger side section of the frame subassembly.

In some aspects, the techniques described herein relate to a tailgate subassembly alignment method, wherein the striker and the alignment post are on the frame subassembly, wherein the latch and the alignment slot are on the door subassembly.

In some aspects, the techniques described herein relate to a tailgate subassembly alignment method, wherein the pivoting of the door subassembly is about a vertically extending axis, wherein the frame subassembly and the door subassembly are configured to pivot together about a horizontally extending axis back-and-forth between a tailgate closed position and a tailgate open position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 is a rear perspective view of a motor vehicle having a tailgate assembly positioned in a tailgate closed position relative to a cargo space.

FIG. 2 illustrates the tailgate assembly of FIG. 1 in a tailgate open position.

DETAILED DESCRIPTION

Figure 3:
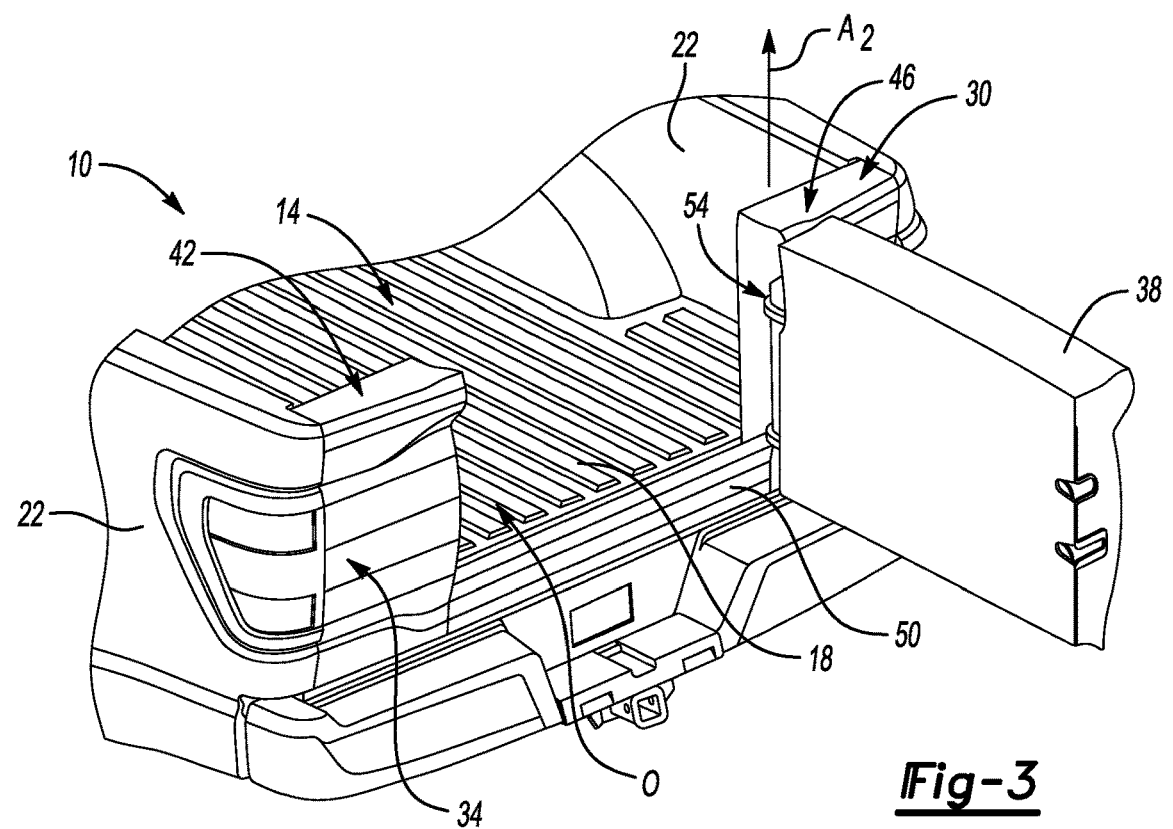
FIG. 3 illustrates a door subassembly of the tailgate assembly of FIG. 1 in a door open position.
Figure 4:
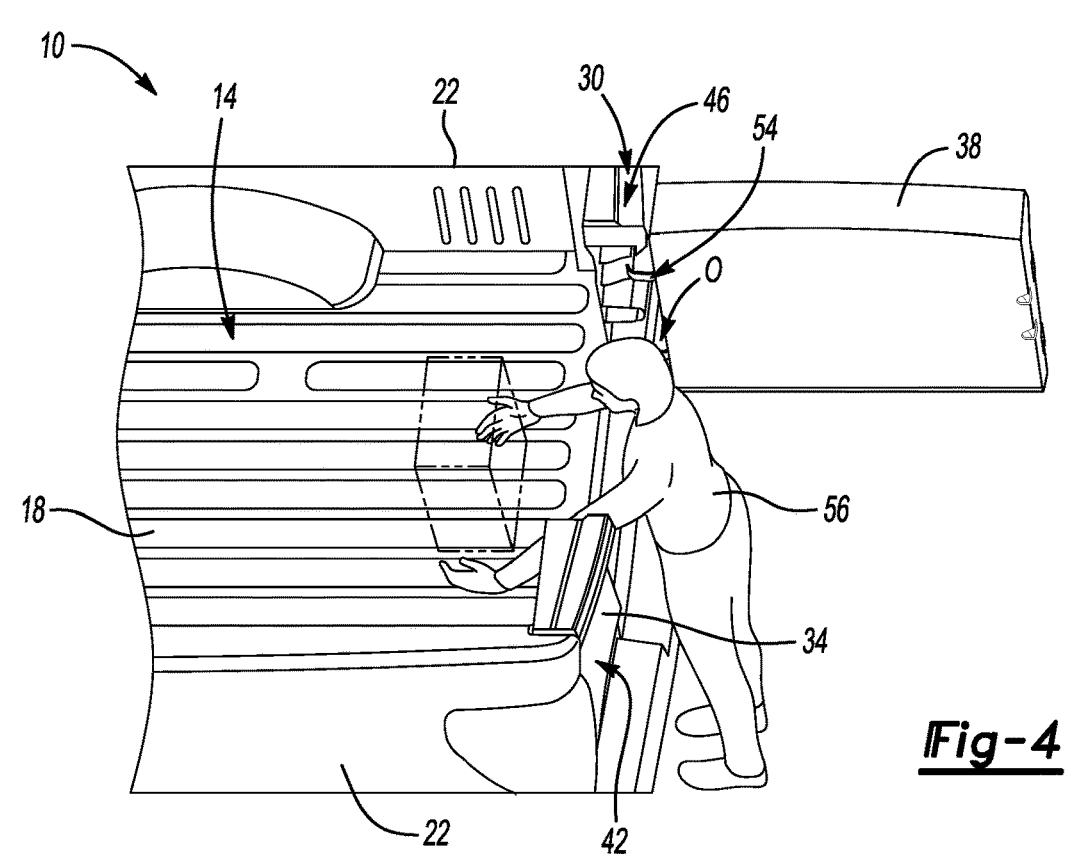
FIG. 4 is a rear and top view of the tailgate assembly of FIG. 3.

This disclosure details exemplary alignment assemblies and methods associated with a tailgate assembly of a vehicle. In particular, the disclosure is directed toward aligning a door subassembly of the tailgate assembly relative to a frame subassembly of the tailgate assembly. Aligning helps to ensure desired fit and finish, and that functional requirements are met.

FIGS. 1-4 illustrate selected portions of a motor vehicle 10 that includes a cargo space for storing and/or hauling cargo. In the illustrated embodiment, the vehicle 10 is a pickup truck, and the cargo space is established by a cargo bed 14 of the pickup truck.

While a pickup truck with a cargo bed is specifically depicted and referenced herein, other vehicles having other types of cargo spaces could also benefit from the teachings of this disclosure. The vehicle 10 could be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The cargo bed 14 is generally rearward of a passenger cabin (not shown) of the vehicle 10. The cargo bed 14 includes a floor 18 extending between a pair of longitudinally extending sidewalls 22, a front wall 26, and a tailgate assembly 30. The overall size, shape, and configuration of the cargo bed 14 are not intended to limit this disclosure.

The tailgate assembly 30 can be considered a Multi-Axis Tailgate that includes, among other things, a frame subassembly 34 and a door subassembly 38.

The frame subassembly 34, in the exemplary embodiment, includes a driver side section 42, a passenger side section 46, and a connection member 50 (see FIG. 3) connecting the driver side section 42 to the passenger side section 46.

The door subassembly 38 is sometimes be referred to as a "swing gate subassembly." The door subassembly 38 is pivotably coupled to the passenger side section 46 of the frame subassembly 34. At least one hinge assembly 54 is used to pivotably connect the door subassembly 38 to the passenger side section 46. When in a door closed position shown in FIGS. 1 and 2, the door subassembly 38 latches to the driver side section 42. In another example, the door subassembly 38 is pivotably connected to the driver side section 42 and latches to the passenger side section 46.

The tailgate assembly 30 is pivotable about a first axis A1 relative to the cargo bed 14 back-and-forth between a tailgate closed position shown in FIG. 1 and a tailgate open position shown in FIG. 2. The tailgate assembly 30 can be pivoted from the tailgate closed position to the tailgate open position in response to actuating a handle of the tailgate assembly 30, for example.

The tailgate assembly 30 is vertically aligned when in the tailgate closed position and encloses an end of the cargo bed 14 that is opposite from the front wall 26. The tailgate assembly 30 is horizontally aligned when in the tailgate open position to facilitate access to the cargo bed 14. Vertical and horizontal, for purposes of this disclosure, are with reference to ground in the ordinary orientation of the vehicle 10 during operation.

The door subassembly 38 of the tailgate assembly 30 is in the door closed position and is latched to the driver side section 42 of the frame subassembly 34 when the frame subassembly 34 and the door subassembly 38 are pivoted between the tailgate closed position and the tailgate open position. Thus, the frame subassembly 34 and the door subassembly 38 pivot together as a unit when the tailgate assembly 30 is transitioned back and forth between the tailgate closed position and the tailgate open position.

When in the tailgate closed position, the door subassembly 38 is pivotable relative to the frame subassembly 34 about a second axis A2 between the door closed position shown in FIG. 1 and a door open position shown in FIG. 3. In this example, the first axis A1 is a horizontally extending axis, and the second axis A2 is transverse to the first axis A1 and is a vertically extending axis. The door subassembly 38 may be moved between the door closed position and the door open position by grasping another handle of the tailgate assembly 30, for example.

The door subassembly 38 provides a cargo bed access opening O when moved to the door open position. In an embodiment, the cargo bed access opening O extends vertically downward at least as far as the floor 18 of the cargo bed 14. A user 56 (see FIG. 4) can access the cargo bed 14 through the cargo bed access opening O when the door subassembly 38 is in the door open position. Placing the door subassembly 38 in the door open position allows the user 56 to move closer to the cargo bed 14 than, for example, when the tailgate assembly 30 is positioned in the tailgate open position of FIG. 2. The cargo bed access opening O can also provide clearance for the user 56 to enter the cargo bed 14 to either load or retrieve an item of cargo (see FIG. 4).

5

Figure 5:
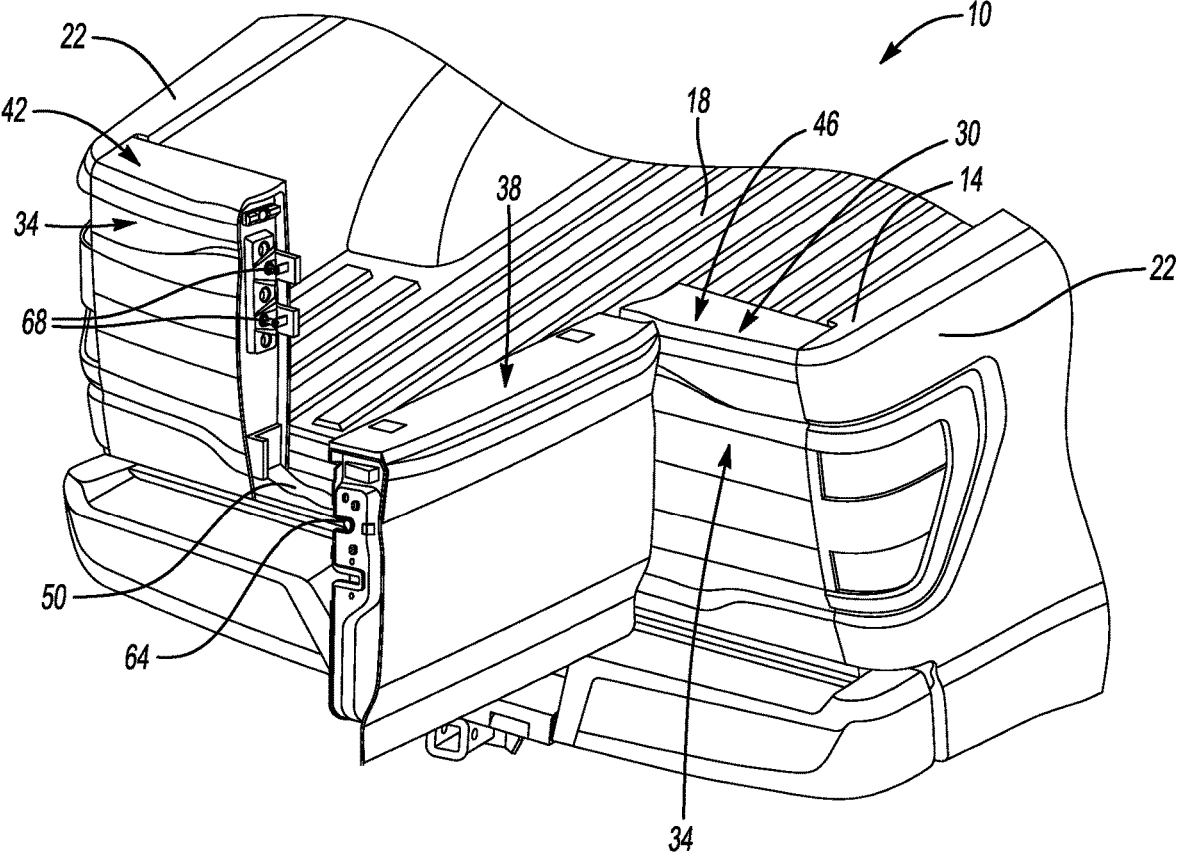
FIG. 5 illustrates the door subassembly in the position of FIG. 3 when viewed from a rear passenger side of the vehicle.
Figure 7:
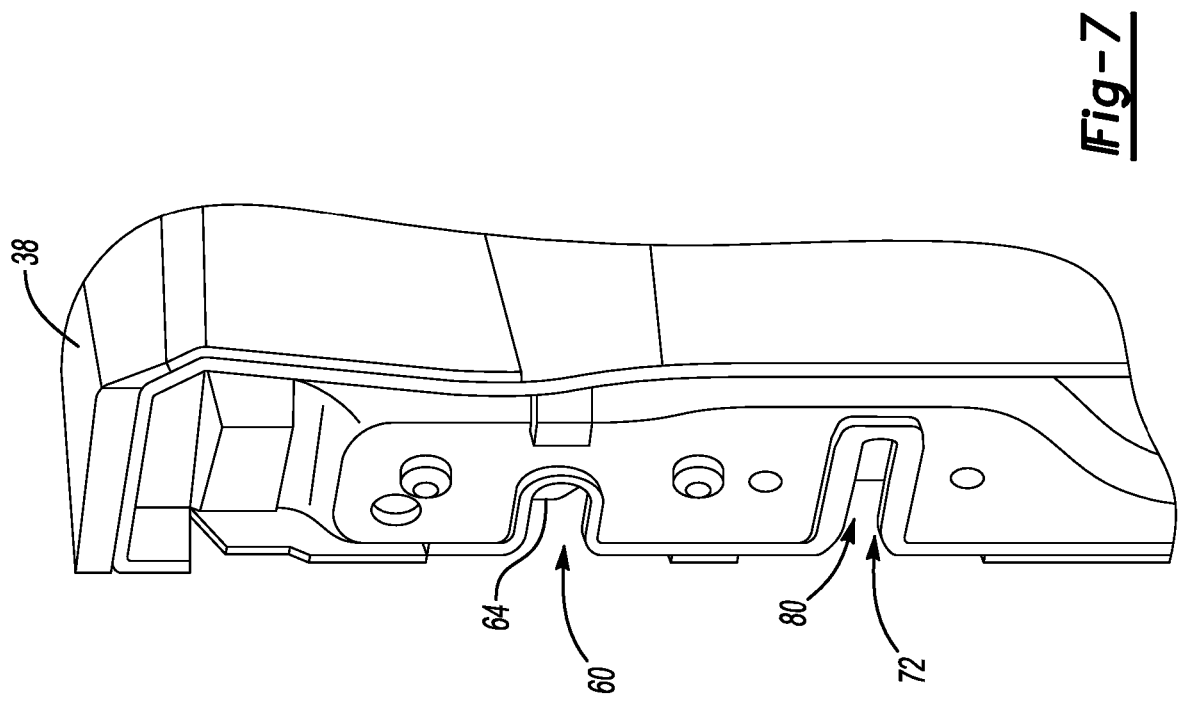
FIG. 7 illustrates a closeup view of an end of the door subassembly from FIG. 5 and showing a latch of the latching system along with an alignment slot of the alignment system.
Figure 6:
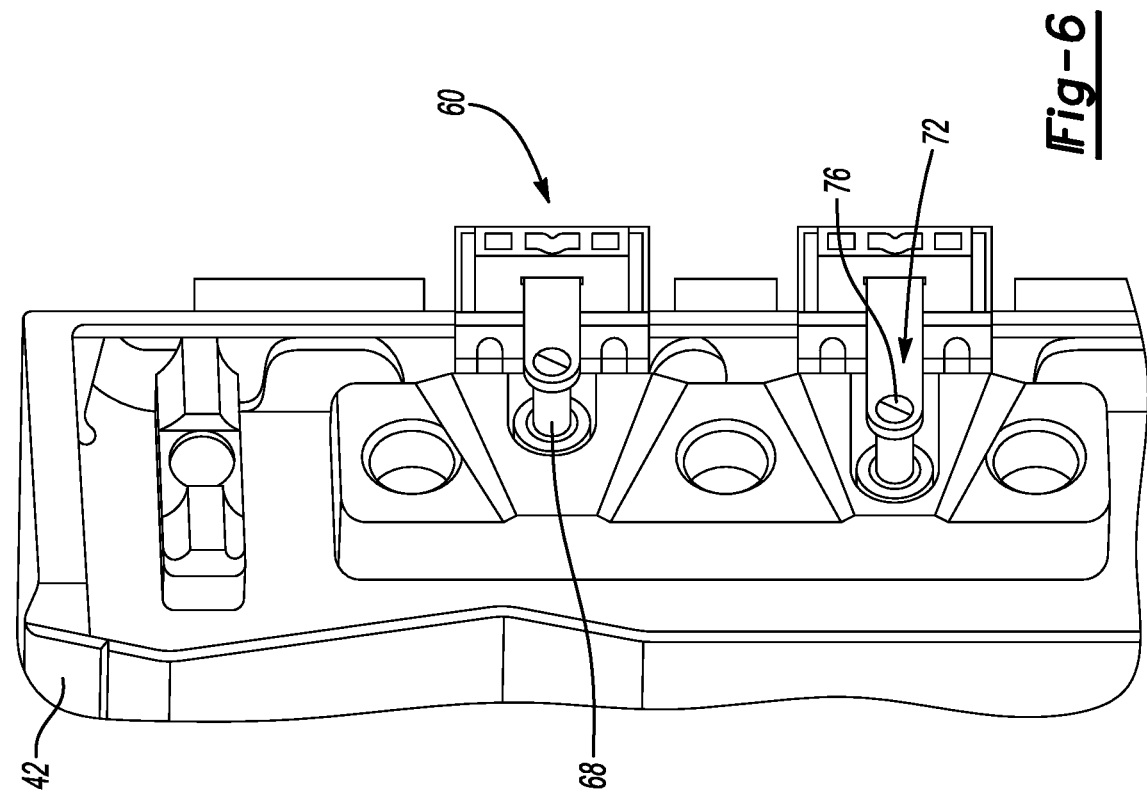
FIG. 6 illustrates a closeup of an area of the frame subassembly from FIG. 5 showing a striker of a latching system and an alignment post of an alignment system.

With reference now to FIGS. 5-7, a latching system 60 includes a latch 64 and a striker 68. When the door subassembly 38 is in the door closed position, the latch 64 engages the striker 68 to hold the door subassembly 38 in the door closed position of FIG. 1. In this example, the latch 64 is on the door subassembly 38, and the striker 68 is on the frame subassembly 34.

The tailgate assembly 30 additionally includes an alignment system 72 separate from the latching system 60. The alignment system 72 includes an alignment post 76 and an alignment slot 80. The alignment post 76 is received within the alignment slot 80 as the door subassembly 38 is pivoted to the door closed position. The alignment post 76 received within the alignment slot 80 blocks vertical movement of the door subassembly 38 relative to the frame subassembly 34 to align the door subassembly 38 relative to the frame subassembly 34 as the door subassembly 38 is moved to the door closed position.

In this example, the alignment post 76 is on the frame subassembly 34 and the alignment slot 80 is on the door subassembly 38. In other example, the alignment slot 80 could be provided on the frame subassembly 34 and the alignment post 76 could be part of the door subassembly 38.

Notably, the alignment post 76 being received within the alignment slot 80 aligns the door subassembly 38 just prior to door subassembly 38 reaching the closed position where the latching system 60 can hold the door subassembly 38 in the door closed position.

Figure 8B:
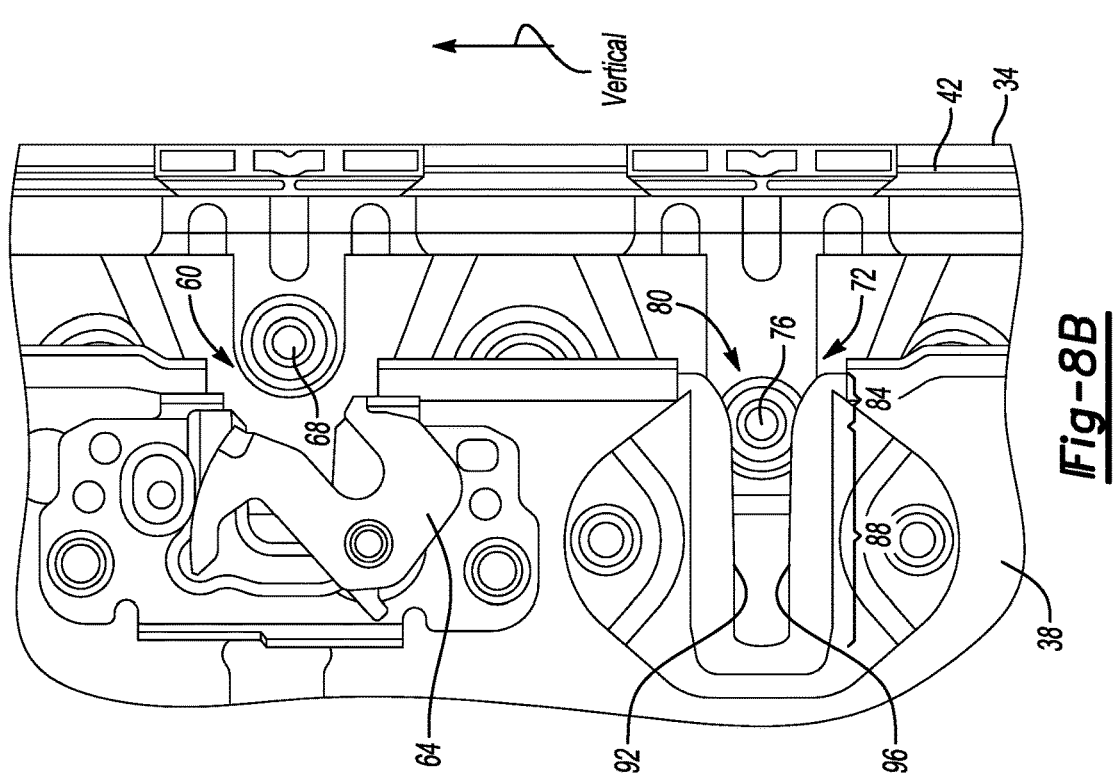
FIGS. 8A-8D illustrate selected views looking outboard from within the door subassembly as the door subassembly is pivoting relative to the frame subassembly from a door open position to the door closed position of FIG. 1.
Figure 8A:
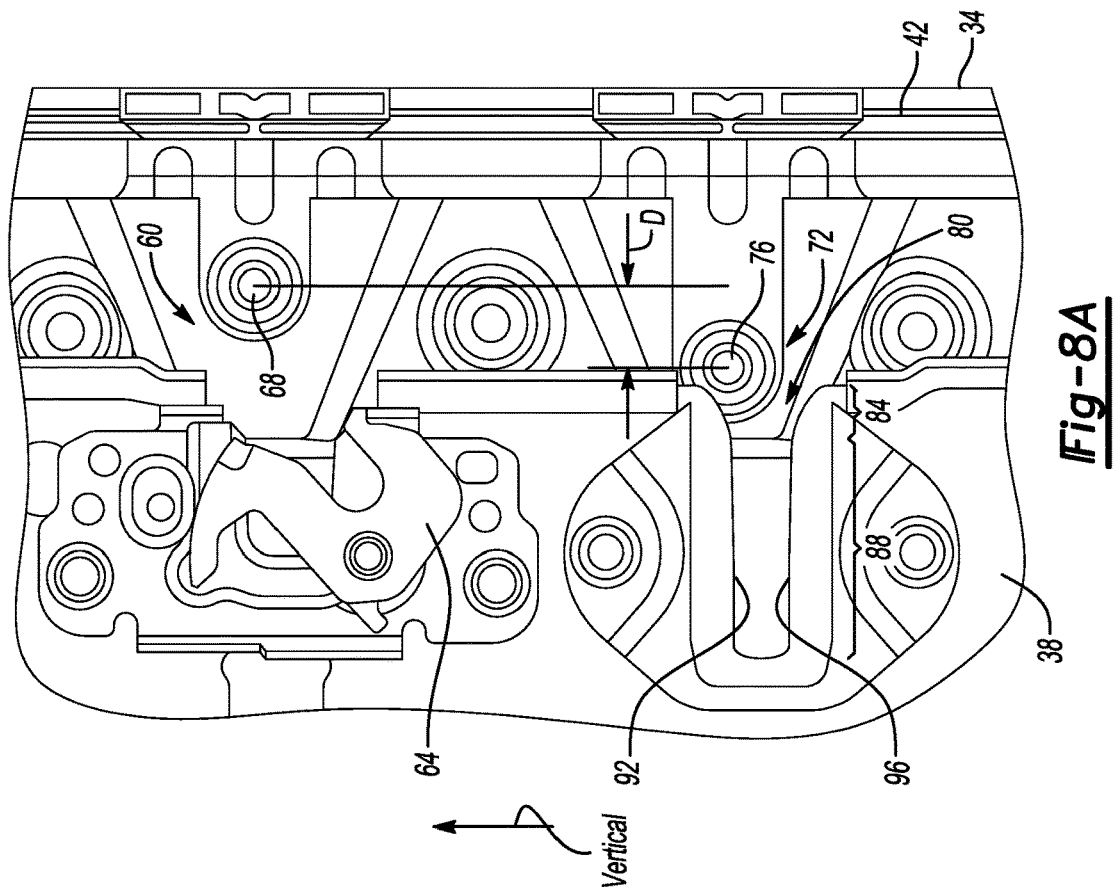

With reference now to FIGS. 8A-8D, and continuing reference to FIGS. 5-7, the alignment slot 80 includes a flared inlet section 84 tapering down to a narrowed primary section 88. As the door subassembly 38 is pivoted to the door closed position, the alignment post 76 is initially received within the flared inlet section 84 of the alignment slot 80. The tapering of the flared inlet section 84 guides the alignment post 76 into the primary section 88 of the alignment slot 80. This guiding may be due to contact between the edges of the flared inlet section 84 and the alignment post 76. The door subassembly 38 may shift vertically upward or downward relative to the frame subassembly 34 depending on where the alignment post 76 contacts the edges of the alignment slot 80. In the example of FIGS. 8A and 8B, the door subassembly 38 shifts vertically upward relative to the frame subassembly 34 due to the alignment post 76 contacting edges of the flared inlet section 84 and being guided toward the primary section 88 as the door subassembly 38 pivots.

As the door subassembly 38 continues to close and the alignment post 76 is received within the primary section 88 of the alignment slot 80, the vertical movement of the alignment post 76 is constrained. This helps to ensure that the latch 64 is in proper vertical alignment with the striker 68 when the door subassembly 38 is pivoted further to the position where the latch 64 can engage the striker 68 to hold the door subassembly 38.

In this example, an upper edge 92 of the alignment slot 80 and a lower edge 96 of the alignment slot 80 are, within the primary section 88 of the alignment slot 80 parallel to one another. The upper edge 92 blocks vertical upward movement of the alignment post 76 relative to the alignment slot 80. The lower edge 96 blocks vertical downward movement of the alignment post 76 relative to the alignment slot 80.

Thus, the vertical movement of the door subassembly 38 relative to the frame subassembly 34 is constrained substantially an equal amount whenever the alignment post 76 is within the primary section 88 of the alignment slot 80. When the alignment post 76 is vertically centered within the primary section 88 of the alignment slot 80, there could be, in an example, a 0.5 millimeter gap between the alignment post 76 and the upper edge 92. There could also be a 0.5 millimeter gap between the alignment post 76 and the lower edge 96. Thus, when the alignment post 76 is within the primary section 88 of alignment slot 80, the door subassembly 38 can only move vertically relative to the frame subassembly 34, at most, one millimeter. This can provide a desired vertical alignment for the door subassembly 38 relative to the frame subassembly 34, which can both help to ensure engagement of the latching system 60 and fit and finish design goals.

As the door subassembly 38 pivots toward the door closed position, the alignment post 76 enters the flared inlet section 84 of the alignment slot 80 prior to the latch 64 interfacing with the striker 68. This is due to the alignment post 76 being positioned aft of the striker 68 a distance D. Aft is with reference to a general orientation of the vehicle 10. In this example, the distance D is about five millimeters.

Figure 8D:
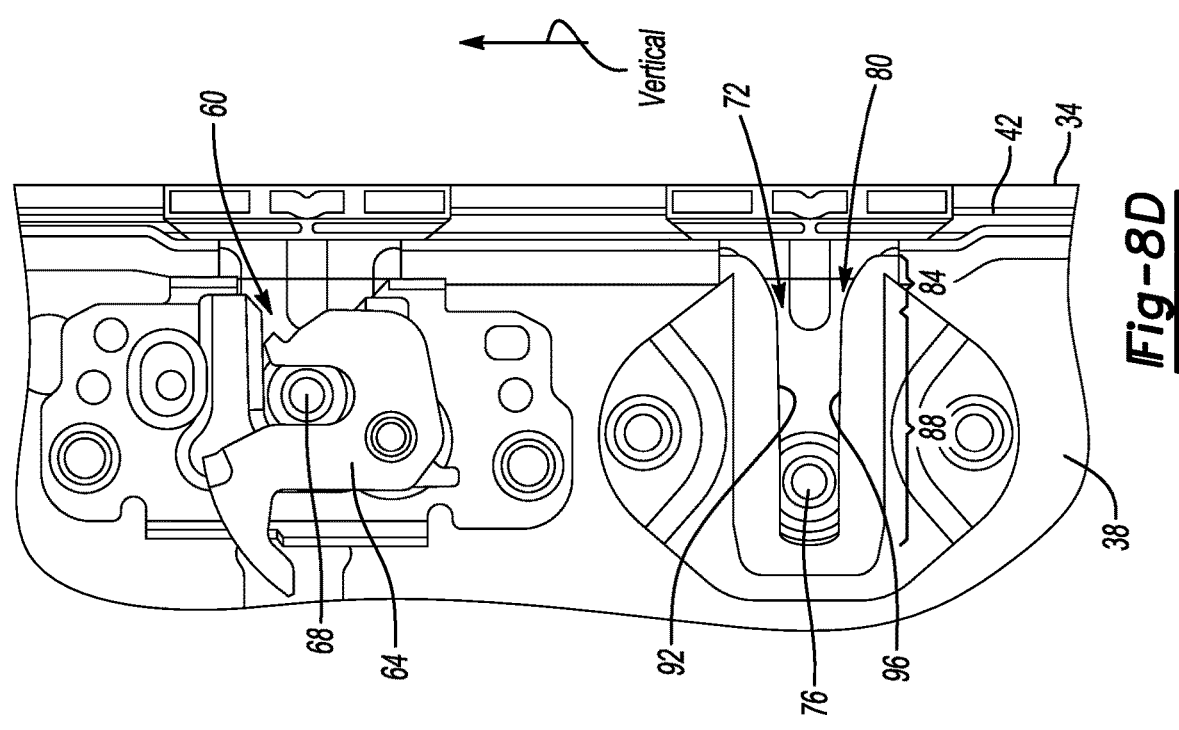
Figure 8C:
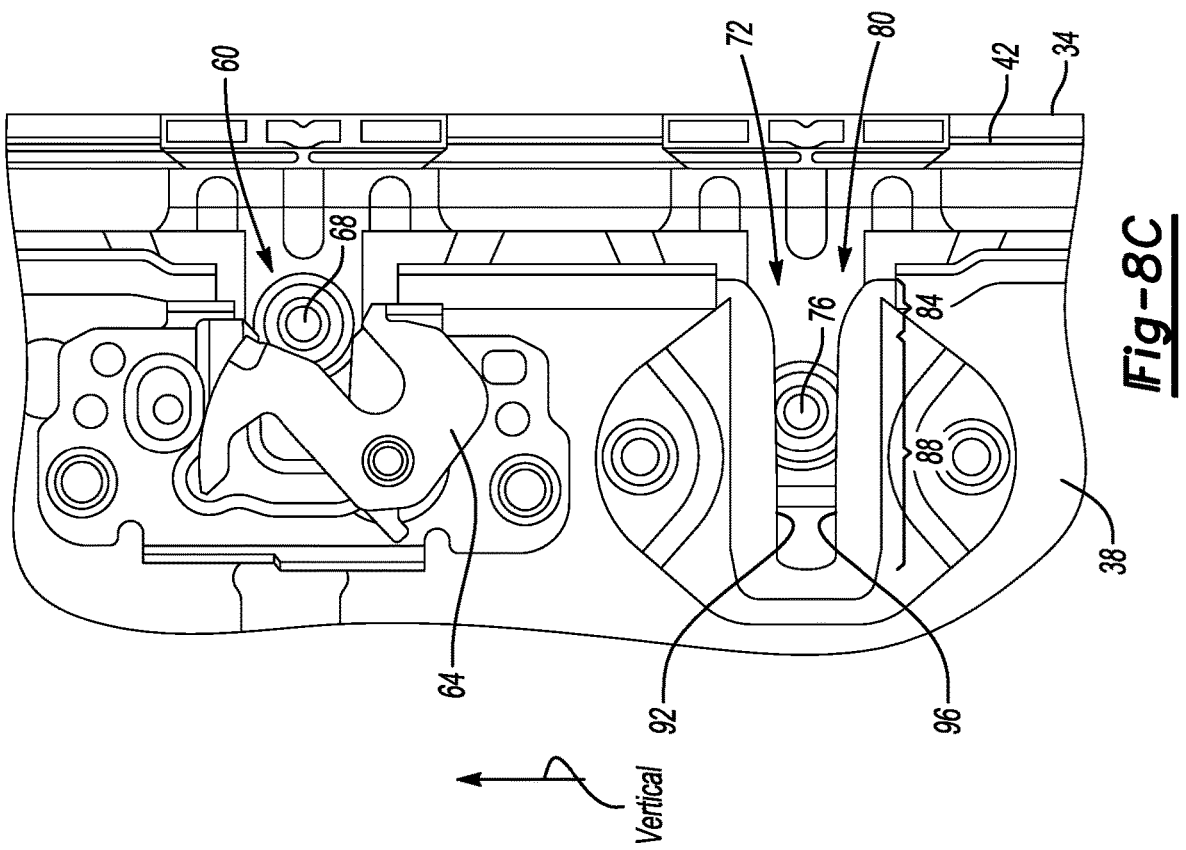

In FIG. 8C, the latch 64 contacts the striker 68 to begin to engage the latching system 60. At this time, the alignment post 76 is well within the primary section 88 of the alignment slot 80. As the door subassembly 38 pivots from the position of FIG. 8C to the position of FIG. 8D, the alignment post 76 is constrained vertically due to the positioning of the alignment post 76 within the primary section 88 of the alignment slot 80.

In FIG. 8D, the door subassembly 38 has pivoted all the way to the door closed position where the latch 64 can engage the striker 68. The latch 64 and the striker 68 constrain forward and aft movement of the door subassembly 38 relative to the frame subassembly 34 when the door subassembly 38 is in the door closed position.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A tailgate assembly, comprising:
   a frame subassembly having a cargo bed access opening between a driver side section and a passenger side section;
   a door subassembly that is pivotably coupled to the frame subassembly, the door subassembly pivotable relative to the frame subassembly back-and-forth between a door open position and a door closed position, the door subassembly closing the cargo bed access opening when the door subassembly is in the door closed position;
   a latching system having a latch that engages a striker to hold the door subassembly in the door closed position; and
   an alignment system separate from the latching system, the alignment system including an alignment post that is received within an alignment slot as the door subassembly is pivoted to the door closed position, the alignment post configured to be received within the alignment slot to align the door subassembly relative to the frame subassembly prior to the latch contacting the striker, wherein the alignment post is configured to be fully received within the alignment slot to align the door subassembly relative to the frame subassembly prior to the latch contacting the striker.

2. The tailgate assembly of claim 1, wherein the frame subassembly and the door subassembly pivot together about a horizontally extending axis, wherein the door subassembly pivots relative to the frame subassembly about a vertically extending axis.

3. The tailgate assembly of claim 1, wherein the driver side section is on a driver side of the cargo bed access opening in the tailgate assembly, and the passenger side section is on a passenger side of the cargo bed access opening.

4. The tailgate assembly of claim 1, wherein the alignment slot includes a flared inlet section that tapers down to a primary section, the alignment post fully received within the primary section prior to the latch contacting the striker.

5. A tailgate assembly, comprising:
a frame subassembly having a cargo bed access opening between a driver side section and a passenger side section;
a door subassembly that is pivotably coupled to the frame subassembly, the door subassembly pivotable relative to the frame subassembly back-and-forth between a door open position and a door closed position, the door subassembly closing the cargo bed access opening when the door subassembly is in the door closed position;
a latching system having a latch that engages a striker to hold the door subassembly in the door closed position; and
an alignment system separate from the latching system, the alignment system including an alignment post that is received within an alignment slot as the door subassembly is pivoted to the door closed position, the alignment post configured to be received within the alignment slot to align the door subassembly relative to the frame subassembly prior to the latch contacting the striker,
wherein the alignment slot includes a flared inlet section that tapers down to a primary section,
wherein the primary section is at least partially provided by an upper edge configured to contact the alignment post to block vertically upward movement of the alignment post, and a lower edge configured to contact the alignment post to block vertically downward movement of the alignment post, the upper edge parallel to the lower edge.

6. The tailgate assembly of claim 1, wherein the alignment post is configured to be received within the alignment slot to align the door subassembly vertically relative to the frame subassembly.

7. The tailgate assembly of claim 1, wherein the latch and the alignment slot are on the door subassembly.

8. The tailgate assembly of claim 1, wherein the latch is on the door subassembly and the striker is on the frame subassembly.

9. The tailgate assembly of claim 1, wherein the alignment post is on the frame subassembly and the striker is on the frame subassembly.

10. The tailgate assembly of claim 9, wherein the alignment post is entirely aft of the striker when the door subassembly and the frame subassembly are in a tailgate closed position.

11. The tailgate assembly of claim 1, wherein the latch and striker constrain forward and aft movement of the door subassembly relative to the frame subassembly when the door subassembly is in the door closed position.

12. A tailgate subassembly alignment method, comprising:
pivoting a door subassembly of a tailgate assembly relative to a frame subassembly of the tailgate assembly from a door open position to a door closed position, the door subassembly closing a cargo bed access opening of the frame subassembly when the door subassembly is in the door closed position;
during the pivoting, positioning an alignment post fully within an alignment slot to align the door subassembly relative to the door frame subassembly, wherein contact between an upper edge of the alignment slot and the alignment post blocks vertically upward movement of the alignment post, and contact between a lower edge of the alignment slot and the alignment post blocks vertically downward movement of the alignment post; and
engaging a striker of a latching system with a latch of the latching system to hold the door subassembly in the door closed position.

13. The tailgate subassembly alignment method of claim 12, wherein the positioning is prior to the engaging.

14. The tailgate subassembly alignment method of claim 12, wherein the alignment slot includes a flared inlet section that tapers down to a primary section, wherein the alignment post has passed through the flared inlet section and is within the primary section of the alignment slot prior to the latch engaging the striker.

15. The tailgate subassembly alignment method of claim 12, wherein the alignment post within the alignment slot aligns the door subassembly vertically relative to the frame subassembly.

16. The tailgate subassembly alignment method of claim 12, wherein the striker and the alignment post are on the frame subassembly, wherein the latch and the alignment slot are on the door subassembly.

17. The tailgate subassembly alignment method of claim 12, wherein the pivoting of the door subassembly is about a vertically extending axis, wherein the frame subassembly and the door subassembly are configured to pivot together about a horizontally extending axis back-and-forth between a tailgate closed position and a tailgate open position.

18. The tailgate assembly of claim 1, wherein the alignment post is oriented such that a longitudinal axis of the alignment post is transverse to a longitudinal axis of the alignment slot, and wherein alignment occurs by side-entry of the alignment post into the alignment slot during pivoting of the door subassembly.

19. The tailgate assembly of claim 1, wherein the alignment post extends longitudinally in a cross-vehicle direction when the alignment post is received within the alignment slot.

20. The tailgate assembly of claim 1, wherein the alignment post is oriented transverse to the alignment slot when the alignment post is received within the alignment slot.

* * * * *